United States Patent [19]

Michaud

[11] 4,328,914
[45] May 11, 1982

[54] VEHICLE MOUNTED CARRIER ASSEMBLY

[76] Inventor: Reginal O. Michaud, 769 Maple St., Wethersfield, Conn. 06109

[21] Appl. No.: 220,418

[22] Filed: Dec. 29, 1980

[51] Int. Cl.³ .............................................. B62J 9/00
[52] U.S. Cl. ..................................... 224/31; 224/32 A
[58] Field of Search .................... 224/30 R, 30 A, 31, 224/32 R, 32 A, 39-41; 190/52; 280/202

[56] References Cited

U.S. PATENT DOCUMENTS

| 299,609 | 6/1884 | Wood . | |
|---|---|---|---|
| 481,890 | 8/1892 | Blood . | |
| 607,487 | 7/1898 | Schaum . | |
| 2,539,381 | 1/1951 | Bachmann | 224/32 R |
| 2,577,560 | 7/1947 | Ashdowne | 224/32 |
| 3,786,972 | 6/1974 | Alley | 224/31 |
| 3,970,229 | 7/1976 | Norinsky | 224/31 |
| 4,174,795 | 11/1979 | Jackson et al. | 224/32 A |
| 4,258,870 | 4/1981 | Edelson | 224/32 A |
| 4,260,084 | 4/1981 | Warren, Jr. | 224/320 A |

FOREIGN PATENT DOCUMENTS

| 897646 | 3/1945 | France | 224/32 A |
|---|---|---|---|
| 983825 | 6/1951 | France | 224/32 A |
| 43348 | 6/1938 | Netherlands | 224/32 A |
| 646120 | 11/1950 | United Kingdom | 224/32 R |

Primary Examiner—Stephen Marcus

[57] ABSTRACT

A carrier assembly comprises a supporting rack and carrier means disengageably mounted thereon. The supporting rack has a freestanding frame portion, and the carrier means has a sleeve portion which is closed at the top and the sides and open at the bottom, to provide a generally rectangular recess which is dimension and configured to correspond to the frame portion of the rack, and to slidingly and snugly receive it. The resultant assembly provides good support and stability, coupled with facility of use and manufacture, and relatively low cost.

13 Claims, 6 Drawing Figures

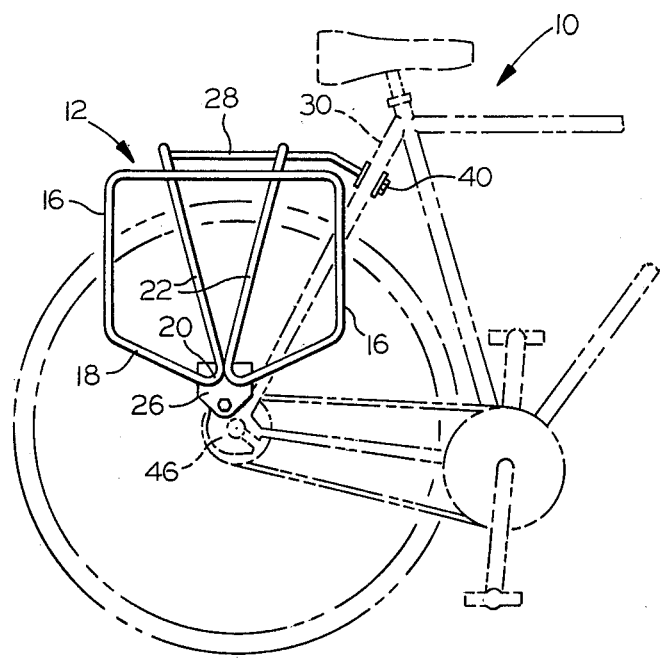
FIG. 1
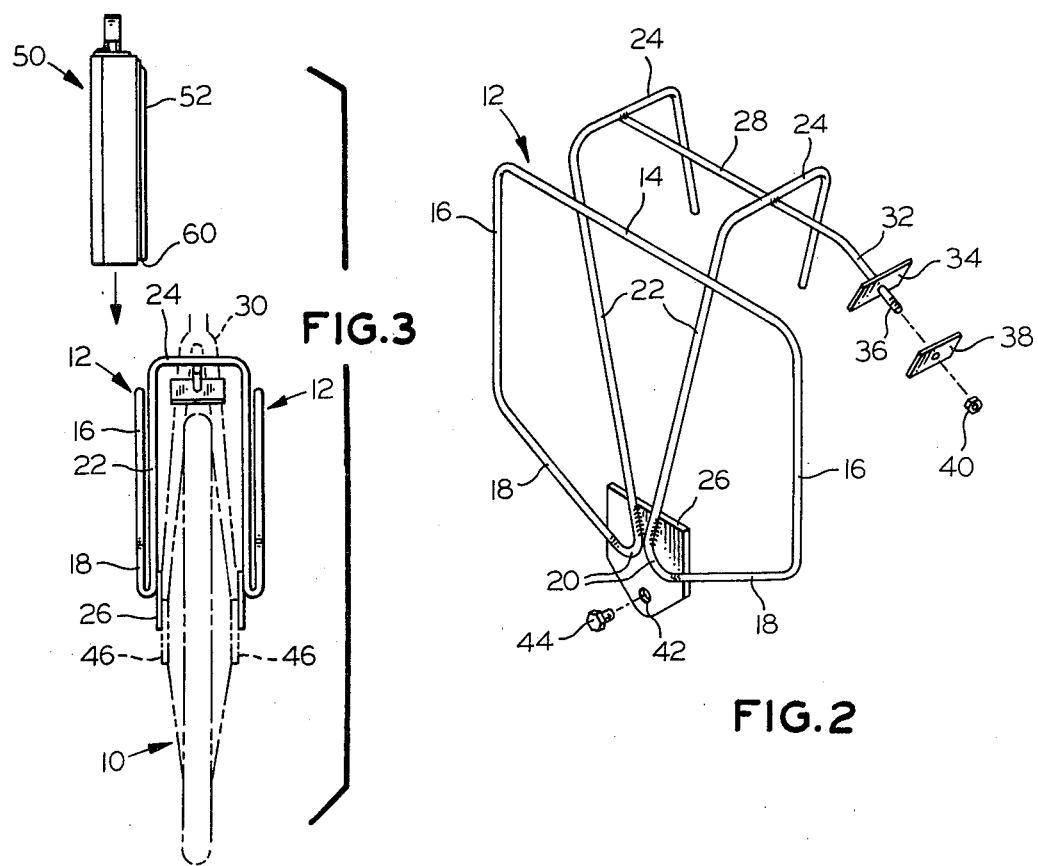
FIG. 3
FIG. 2

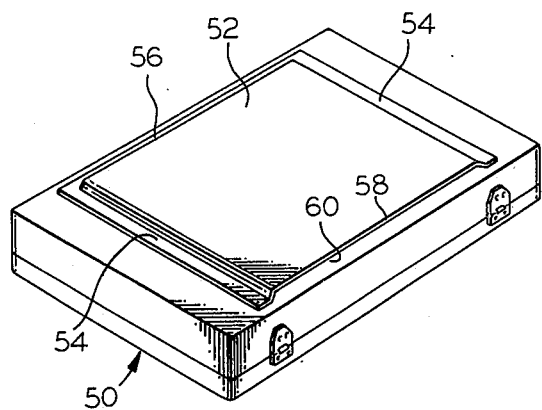
FIG. 4
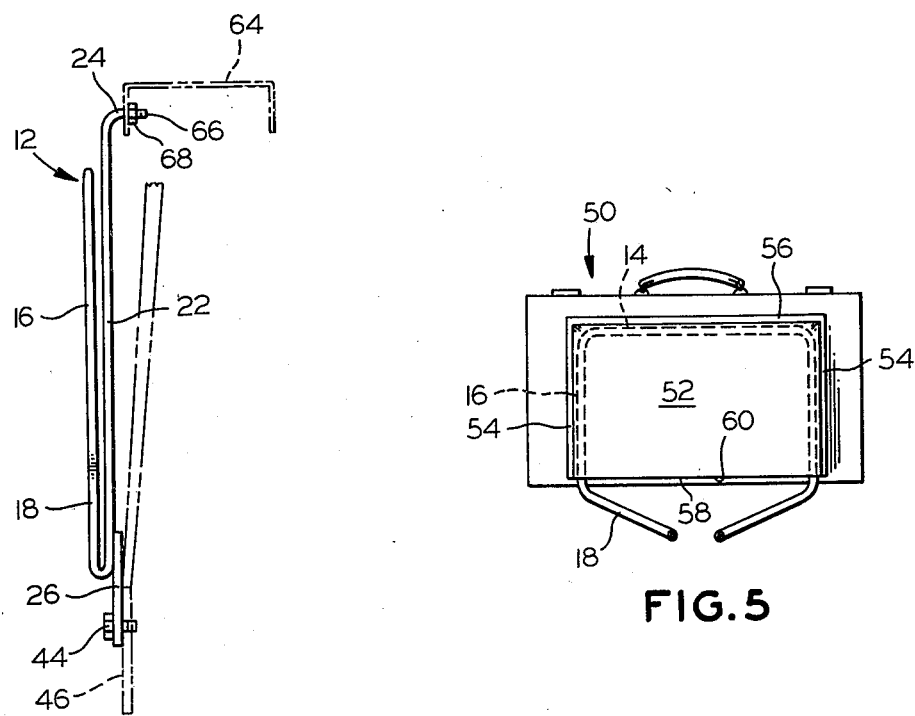
FIG. 6
FIG. 5

VEHICLE MOUNTED CARRIER ASSEMBLY

BACKGROUND OF THE INVENTION

Baskets and racks of various types are, of course, widely utilized on bicycles and motorcycles to assist the cyclist in transporting packages and various kinds of bags and cases, including saddlebags, valises, pannier bags, briefcases, and the like. The racks will generally comprise a supporting structure designed to be secured to the cycle, and may be specifically designed for assembly with a particular type of container.

Typical of this sort of equipment, previously described in the art, are the assemblies shown in Wood, U.S. Pat. No. 299,609; Blood, U.S. Pat. No. 481,890; Schaum, U.S. Pat. No. 607,487; Ashdowne, U.S. Pat. No. 2,577,560; Alley, U.S. Pat. No. 3,786,972, and Netherlands Pat. No. 43,348. Although the several constructions shown may, to a greater or lesser degree, be satisfactory for their intended purposes, a need nevertheless remains for an assembly capable of providing secure means by which items may be carried by cyclists, and which is at the same time highly convenient to employ and facile and relatively inexpensive to manufacture.

Accordingly, it is an object of the present invention to provide a novel carrier assembly for affixing to a wheeled vehicle, which assembly is not only convenient to use, but also provides very stable and secure containment and support.

It is also an object of the invention to provide such an assembly in which the rack is of lightweight and uncomplicated design, and is facile and relatively inexpensive to manufacture.

It is a more specific object of the invention to provide an assembly in which the carrying case or bag may be readily engaged upon and removed from the supporting rack, with the rack providing secure underlying and lateral support despite being of relatively simple and lightweight construction.

SUMMARY OF THE INVENTION

It has now been found that the foregoing and related objects of the invention are readily attained in a carrier assembly comprising a supporting rack and carrier means disengageably mounted thereon. The supporting rack includes a mounting bracket, a stabilizing member, and a freestanding frame portion having a longitudinally extending upper support element. The mounting bracket of the rack is adapted for affixing to a vehicle at a point adjacent the axle of one of its wheels, and is joined to a lower part of the frame portion to dispose it upwardly therefrom, when the bracket is affixed to the vehicle. The stabilizing member is also adapted for affixing to the vehicle, but at a location spaced from the point of affixing of the bracket, to constrain the rack against pivotal displacement. The carrier means has a sleeve portion which is closed at the top and sides and open at the bottom. Thus, a generally rectangular recess is defined, which is dimensioned and configured to correspond to the frame portion of the rack, and to slidingly and snugly seat it, upwardly inserted thereinto. The carrier means recess is substantially equal in width to the length of the upper support element of the frame portion of the rack, thereby providing secure underlying support for the carrier means. The bracket and stabilizing member are so disposed on the rack as to avoid interference with the mounting of the carrier means thereupon.

In the preferred embodiments, the frame portion of the supporting rack is of generally rectangular configuration, and is comprised of the upper element, a pair of parallel side elements and a pair of lower elements. The side elements depend at right angles from the opposite ends of the upper element, with the lower elements extending at obtuse angles toward one another from the lower ends of the side elements, and joining to the bracket at their inner ends.

Most desirably, at least the frame portion of the rack will be integrally formed from a single length of material, and the stabilizing member will extend generally upwardly from the bracket inwardly of the frame portion. The rack will advantageously include two stabilizing members, each being comprised of an arm extending upwardly from the bracket for affixing to the vehicle at a location above its wheel, and preferably they will extend in a generally V-shaped configuration. It is especially desirable that the arms be integrally formed with the frame portion, and they may be adapted for affixation to a separate platform-type of rack provided on the vehicle, if so desired.

In many instances, it will be desirable for the assembly to comprise a pair of supporting racks, adapted for affixing to the vehicle to dispose one of the freestanding frame portions provided thereby on each of the opposite sides of the wheel of the vehicle. In such an embodiment, the stabilizing members of the two racks may extend upwardly and then transversely over the wheel into connection with one another, to thereby provide an integrated, double-rack unit. The double unit may additionally include a tie rod connected to the transverse element of the stabilizing members, which will, in turn, be adapted for affixation to the vehicle. Preferably, each of the racks may have a pair of such upwardly extending stabilizing members, with the corresponding members of each pair being transversely connected to the corresponding members of the other pair, and with the tie rod connecting the two transverse elements to one another, as well as to the vehicle.

BRIEF DESCRIPTION OF THE DRAWINGS

FIG. 1 is a side elevational view of a supporting rack utilized in the carrier assembly of the present invention, mounted on a bicycle, which is fragmentarily shown in phantom line;

FIG. 2 is a fragmentary perspective view of the supporting rack of FIG. 1, removed from the bicycle;

FIG. 3 is a rear view of the rack of FIG. 1, again showing the bicycle fragmentarily and in phantom line, and in addition showing a briefcase in position for mounting upon the rack;

FIG. 4 is a perspective view of the briefcase of FIG. 3, drawn to an enlarged scale and most clearly showing the panel portion providing the recess in which the frame portion of the rack is received;

FIG. 5 is a fragmentary elevational view showing the briefcase seated upon the rack; and FIG. 6 is a rear elevational view of a second embodiment of the invention wherein the rack is of single-sided construction, and is mounted by engagement to a conventional platform-type of rack, which is, together with the portion of the bicycle illustrated, depicted in phantom line.

DETAILED DESCRIPTION OF THE ILLUSTRATED EMBODIMENTS

Turning now in detail to FIGS. 1-3 of the drawings, therein illustrated is a double-rack unit embodying the invention and adapted for affixing to a bicycle, generally designated by the numeral 10. The unit consists of a pair of racks, each generally designated by the numeral 12, integrally formed from a single length of bent metal rod. Each rack 12 consists of an upper or top element 14, parallel side elements 16 depending at right angles from the opposite ends of the element 14, and lower elements 18 extending toward one another from the lower ends of the side elements 16 and at an obtuse angle thereto. Connected to the inner ends of the lower elements 18, through elbow portions 20, are arm portions 22, which diverge upwardly in a generally V-shaped relationship. At their upper ends, the arms 22 merge into short right-angle transverse elements 24, by which the two racks 12 are joined to one another.

The elbow portions 20 providing the transition between the corresponding lower elements 18 and upstanding arms 22 are secured to a mounting bracket 26, such as by welding. Similarly, a tie-rod 28 is affixed to extend between the two transverse elements 24, longitudinally of the bicycle 10, for engagement thereto at the intersection of the struts forming the rear fork 30 thereof. For this purpose, the forward portion 32 of the tie-rod 28 is bent at a slight downward angle, and has a short crosspiece 34 affixed inwardly of its threaded outer end portion 36. A second crosspiece 38 is provided, and it will be readily appreciated that the frame portion 30 is clamped between the pieces 34 38, by tightening of the nut 40 upon the end portion 36. The mounting plate 26 has an aperture 42 formed therethrough, in which is received a bolt 44; the bolt is, in turn, engaged in a threaded opening (not visible) provided in the dropout portion 46 of the frame of the bicycle 10.

Thus, it will be appreciated that the brackets 26 on either side of the unit provide the primary means of affixation to the bicycle, and that the tie-rod 28, acting through the arms 22, provides additional support and security, serving in part to prevent displacement of the unit in a pivotal sense about the points of attachment of the brackets 26 adjacent the axle of the wheel. As will also be appreciated, the elements 14, 16 and 18 of each of the racks 12 cooperate to provide a generally rectangular, open frame portion which is disposed upwardly from the bracket 26, and which serves as the structure on which the separate carrier means is mounted.

More specifically, an appropriately constructed briefcase, generally designated by the numeral 50, is shown in greatest detail in FIG. 4. The briefcase 50 may be entirely conventional in all respects, with the exception that it has a supplemental panel 52 attached to one of its surfaces. The panel 52 is secured along only three of its marginal edges 54, 56, corresponding respectively to the two sides and the top of the briefcase 50, leaving the edge of the panel corresponding to the bottom of the briefcase open. This provides a sleeve having a recess 60 of generally rectangular cross-section, into which the frame portion of the rack 12 may be inserted; the pre-insertion position of the briefcase 50 is shown in FIG. 3, and the assembled relationship is depicted in FIG. 5. From the latter Figure, it can readily be seen that, by virtue of the top element 14, the rack 12 provides secure underlying support across substantially the entire width of the briefcase 50, and that the side elements 16 provide comparably secure lateral support. Because the supporting portion of the rack 12 is of relatively large area, and is generally rectangular and dimensioned to conform to the configuration of the recess 60, secure, close-fitting, and yet readily disengageable assembly with the briefcase 50 is assured. It will, of course, be appreciated that the panel 52 can be attached to the briefcase 50 by any appropriate means, such as by stitching, adhesive bonding, rivets, and the like, and that it may be formed during manufacture or subsequently added.

Turning finally to FIG. 6, therein depicted is a single-sided rack 12, which is otherwise comparable to the racks of the double unit described in connection with the previous Figures. In this embodiment, the bracket 26 is, again, secured to the dropout 46 of the bicycle 10 by the threadably engaged bolt 44. However, rather than having the two arm portions 22 (only one being visible) extend upwardly and across the vehicle, the transverse elements 24' are foreshortened and have threaded end portions 66 thereon. The arms 22 are thus secured to a conventional platform type of supporting rack 64, by insertion of the end portions 66 through appropriate apertures provided therein, and by tightening of the nuts 68 thereupon. As will be appreciated, the arms 22 may be disposed in the V-shaped relationship shown in the previous Figures, thus affording two spaced points of attachment to the platform rack 64. Moreover, although only one rack 22 is shown in FIG. 6, two independent racks may be mounted on opposite sides of a vehicle in a manner much the same as the double-rack unit first described.

Although the drawing depicts a briefcase 50, the invention is, of course, equally applicable to carrier assemblies in which other types of containers are employed, such as the previously mentioned saddlebags, valises, pannier bags, pouches, and the like, as long as the particular container has an appropriate sleeve portion for assembly with the rack. The invention may be of especial value when the carrier member is of non-rigid construction, in view of the firm underlying and transverse support that the rack is capable of providing. Such full support will minimize the amount of sagging or other distortion that might otherwise occur in a supple pouch or bag, and will thereby help to protect the contents against damage.

As has previously been pointed out, regardless of whether the rack is a single or a double unit, it can be of integral construction and formed by appropriate bending of a single length of rod or metal bar stock. Moreover, while it may be most convenient to provide the mounting brackets as added elememts, as shown in the drawings, it is also feasible to incorporate loops or openings into the integrally-formed structures to receive the bolts for attachment. Thus, the racks may be produced conveniently and economically.

The open construction illustrated is advantageous not only from the standpoint of covering a large area with a limited amount of material, but also in minimizing the weight of the supporting rack, thus facilitating handling and shipment and keeping the costs for transportation relatively low. Despite the advantages thereof, configurations other than rectangular may be used for the free-standing portion, such as one in which the side elements extend inwardly toward one another, rather than at right angles to the upper element of the frame portion. In any event, however, it is important that the upper element span substantially the entire width of the carrier means, so as to provide the level of support desired.

Although the supporting rack may advantageously be integrally formed from a bent metal member, it should be understood that other materials and means of construction may also be employed. For example, various parts may be separately made and then joined together, and plastic elements may be especially desirable in certain instances. Similarly, the materials from which the carrier means is constructed may vary widely, with leather, canvas, nylon, and other materials conventionally utilized for such items being entirely appropriate. It might be mentioned that, although the sleeve of the briefcase shown in the illustrated embodiments is provided by a panel secured against an outer surface of the briefcase, the sleeve may lie within the article, as long as the recess that it provides is accessible for upward insertion of the rack frame portion. Also, although the opening of the sleeve will normally correspond to the bottom of the briefcase or other carrier means, that relationship need not exist in all instances.

Thus, it can be seen that the present invention provides a novel carrier assembly adapted for affixing to a wheeled vehicle to provide secure and stable means by which items may be carried. The assembly is of lightweight and uncomplicated design, and hence is facile and relatively inexpensive to manufacture and ship, and the carrier means is readily mounted upon and dismounted from the supporting rack, thus rendering the assembly most convenient to use.

Having thus described the invention, what is claimed is:

1. A carrier assembly for affixing to a wheeled vehicle, comprising a supporting rack and carrier means disengageably mounted thereon; said supporting rack including a mounting bracket, a stabilizing member, and a freestanding frame portion having a longitudinally extending upper support element; said bracket being adapted for affixing to the vehicle at a point adjacent the axle of one of its wheels and being joined to a lower part of said frame portion to dispose said frame portion upwardly therefrom when said bracket is so affixed, and said stabilizing member being adapted for affixing to the vehicle at a location spaced from said point of affixing of said bracket to constrain said rack against pivotal displacement thereabout; and carrier means having a sleeve portion closed at the top and sides and open at the bottom, said sleeve portion providing a generally rectangular recess dimensioned and configured to correspond to said frame portion of said rack and to slidingly and snugly seat said frame portion inserted upwardly thereinto, said recess being substantially equal in width to the length of said upper support element of said frame portion, with said rack thereby providing secure underlying support for said carrier means, said bracket and said stabilizing member being so disposed on said rack as to avoid interference with the mounting of said carrier means thereupon.

2. The assembly of claim 1 wherein said frame portion of said supporting rack is of generally rectangular configuration.

3. The assembly of claim 2 wherein said frame portion is comprised of said upper element, a pair of side elements, and a pair of lower elements, said side elements depending at right angles from the opposite ends of said upper element, and said lower elements extending at obtuse angles toward one another from the lower ends of said side elements and being joined at their inner ends to said bracket, said side elements providing secure lateral support for said carrier means.

4. The assembly of claim 3 wherein said frame portion is integrally formed from a single member.

5. The assembly of claim 1 wherein said stabilizing member extends generally upwardly from said bracket inwardly of said frame portion.

6. The assembly of claim 5 wherein said rack includes two of said stabilizing members, each of said stabilizing members comprising an arm extending upwardly from said bracket for affixing to the vehicle at a location above the adjacent wheel thereof.

7. The assembly of claim 6 wherein said arms and frame portion are integrally formed from a single member.

8. The assembly of claim 6 wherein said arms extend in a generally V-shaped configuration.

9. The assembly of claim 1 wherein said stabilizing member is adapted for affixation adjacent its upper end to a platform-type rack provided on the vehicle.

10. The assembly of claim 1 comprising a pair of said supporting racks, said racks being adapted for affixing to the vehicle to dispose one of said freestanding frame portions on each of the opposite sides of one of the wheels, said stabilizing members of said two racks extending upwardly and transversely into connection with one another to provide an integrated, double-rack unit.

11. The assembly of claim 10 wherein said frame portions and said stabilizing members of both of said racks are integrally formed from a single length of material.

12. The assembly of claim 10 wherein said assembly additionally includes a tie rod connected to the transverse element of said stabilizing members and being adapted for affixation to the vehicle.

13. The assembly of claim 12 wherein each of said racks has a pair of said upwardly extending stabilizing members, the corresponding members of each said pair being transversely connected to the corresponding members of the other pair, with said tie rod tieing together the transverse elements extending between said pairs.

* * * * *